LA FAYETTE D. VORCE.
METHOD AND APPARATUS FOR PRODUCING ALKALINE HYPOCHLORITES.
APPLICATION FILED MAY 28, 1920.
1,414,059.
Patented Apr. 25, 1922.
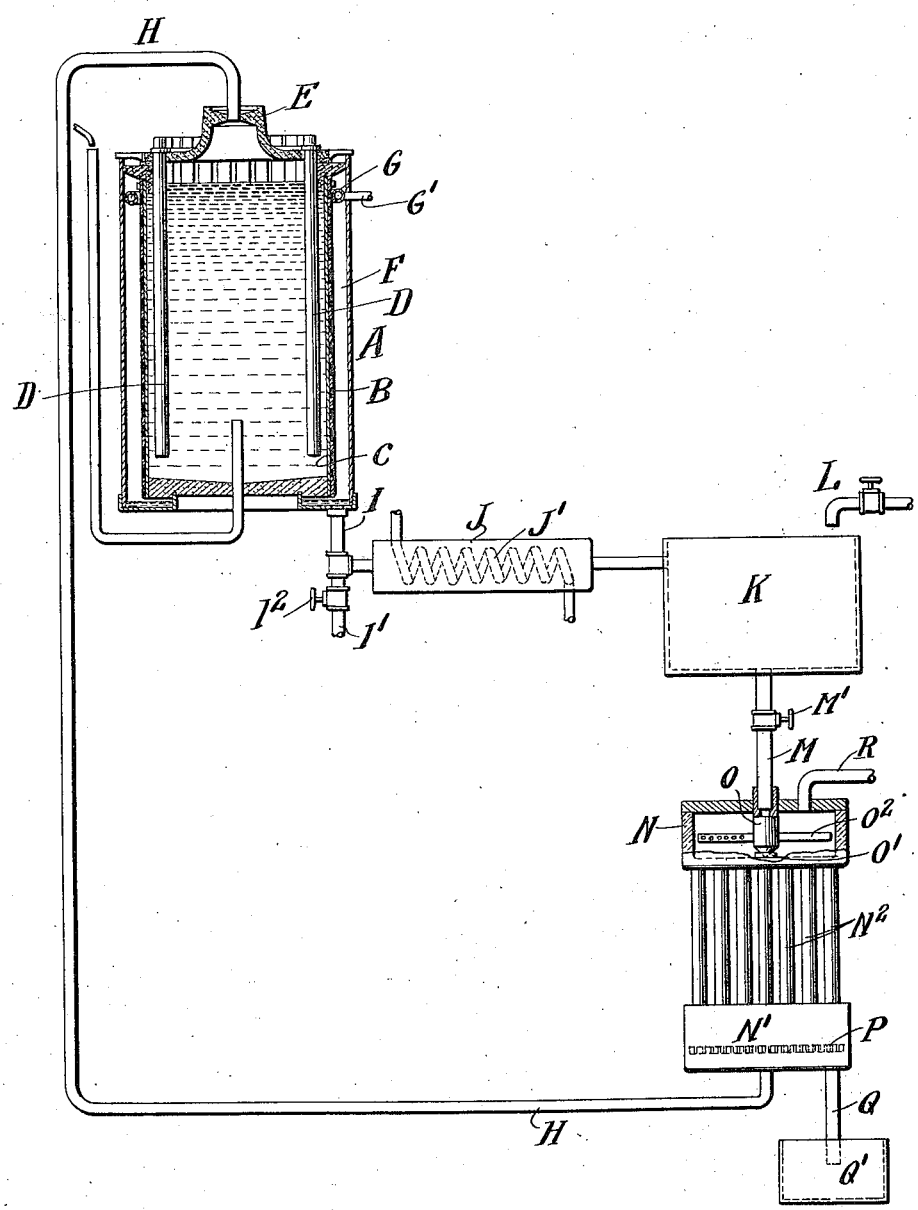

UNITED STATES PATENT OFFICE.

LA FAYETTE D. VORCE, OF WINDSOR, ONTARIO, CANADA.

METHOD AND APPARATUS FOR PRODUCING ALKALINE HYPOCHLORITES.

1,414,059. Specification of Letters Patent. Patented Apr. 25, 1922.

Application filed May 28, 1920. Serial No. 384,963.

*To all whom it may concern:*

Be it known that I, LA FAYETTE D. VORCE, a citizen of the United States of America, residing in Windsor, county of Essex, and Province of Ontario, Dominion of Canada, have invented a certain new and useful Improvement in Methods and Apparatus for Producing Alkaline Hypochlorites, of which the following is a true and exact description, reference being had to the accompanying drawings, which form a part thereof.

My invention relates to a method of producing a solution of an alkaline hypochlorite, suitable for use as a bleaching solution or as a disinfectant, by a reaction of chlorine gas upon a solution of caustic alkali, and to an apparatus especially adapted for the commercial utilization of my new method. The object of my invention is primarily to provide a method of manufacturing alkaline hypochlorite solution which will give a large per cent of available chlorine for the raw materials used in its manufacture and, in addition, to provide for conditions of operation and convenient apparatus for the best economical utilization of my process.

While it has long been known that hypochlorite will be produced by a reaction between caustic alkali and chlorine, the reaction has been accepted as follows:

$$2NaOH + Cl_2 = NaOCl + NaCl + H_2O$$

from which it would follow that the cost of the alkaline hypochlorite produced would be high, in view of the amount of raw materials required and the low yield of hypochlorite. Experiments by Muspratt, Smith and others have also seemed to demonstrate that in the treatment of caustic alkaline solution with chlorine there is produced such large percentage of salt and chlorates as to negative the value of the treatment as a commercial process.

My invention, broadly speaking, depends upon my discovery that a solution of caustic alkali treated with chlorine can and will result in the production of a much larger percentage of hypochlorite than would be the case if the reaction above given is correct and can be produced without the undue production of salt and chlorates indicated by the reported experiments above referred to. The condition which I have discovered to be the controlling one for the economic production of the hypochlorite is that the reactions should be carried on at a low temperature, preferably not to exceed 25° C. and which should not appreciably exceed 30° C., the lower the temperature the better. This low temperature can be maintained by cooling the solution to carry away the heat of reaction or by using a solution of caustic alkali so dilute that the reaction will not raise its temperature to a point where salt and chlorate will be formed, and preferably, I use both a dilute solution and cooling means to maintain a proper low temperature. Essentially, then, my invention consists in treating a solution of caustic alkali, preferably dilute, with chlorine and maintaining the temperature of the solution under treatment at a point below that at which salt and chlorate are formed in undue proportion. The chlorine gas being, of course, used in such proportion to the alkaline contents of the solution that it will practically all react with the alkali.

In practice I have found it to be undesirable to use caustic solution containing over fifteen per cent of caustic even when concentrated solutions of hypochlorite are desired as even at this concentration there is apt to be such intensity of local action as may result in an undue rise of temperature and it is best not to use solutions of over ten per cent caustic contents, and the best results are secured by my process where the caustic solution is diluted to such an extent as to give a proper concentration of chlorine for the bleaching operation had in view. Thus, for instance, if an 18 gram chlorine solution is desired I would preferably dilute the caustic solution to approximately two per cent caustic.

Many cells have been designed for the purpose of producing sodium hypochlorite economically but none of these cells so far as I am aware produce a solution of more than 25 grams of available chlorine per litre and the current consumption varies from 6 K. W. hours upward per kilogram. In a modern caustic chlorine diaphragm cell such as is described in my Patent No. 1,286,844 of Dec. 3, 1918, chlorine with its equivalent amount of caustic is produced in quantities of 30 or more kilograms per day and at a current consumption of 2.75 or less K. W. hours per kilogram and the use of such cells offers an opportunity of producing by my process sodium hypochlorite at a cost much lower than has heretofore been possible, by the organization of a plant in which the caustic soda and chlorine products of the cell are conducted to a combining tower or device with precautions for maintaining the temperature of the solution under treatment below that at which salt and chlorates are formed in deleterious proportion during the reaction.

In carrying out my process I may use the caustic solution as it comes from the cell or dilute it to the desired degree, or I may first concentrate it to recover the undecomposed salt and then dilute the solution to the point required for the desired solution of hypochlorite to be produced.

Reference being now had to the drawing which illustrates somewhat diagrammatically an apparatus adapted for the practice of my invention and in which—

A is an electrolytic cell producing both caustic and chlorine. As shown it has the construction described in my before mentioned former patent, B being the cathode supporting the diaphragm C. D, D, are the anodes supported in the brine chamber. E is the chlorine dome, F the annular chamber formed around the cathode and I the take off for the caustic solution, I' is a bypass controlled by a cock $I^2$. G is a perforated water distributing ring fed by a pipe G' for use in case it is desired to dilute and cool the caustic solution as it is formed and received in chamber F. I is the pipe for the chlorine gas. J is a cooling chamber having a cooling worm J' and K a reservoir for caustic solutions into which water for dilution may be introduced by a pipe L. M is a pipe having a cock M' and leading from reservoir K to a combining tower or device which, as shown, consists of two heads N and N' preferably made of earthenware and connected by tubes, preferably of glass, indicated at $N^2$. A distributing device should be used in head N and I have shown the pipe N opening into a vertically pivoted head O supported on a pivot O' and having perforated arms $O^2$. P is a gas distributive in head N'. Q, an outlet pipe opening into a receiver Q'. R is a suction pipe.

In operation the electrolytic cell A produces chlorine gas which passes from it through the pipe H and a solution of caustic soda which passes from the chamber F through the pipe I and which solution can be cooled and diluted by admitting water through the perforated ring G. As shown, the caustic solution passes through the cooling device J and into the reservoir K where it can be diluted or further diluted to the desired strength. The cooled and diluted caustic solution is then admitted through pipe M into the head N of the combining device and distributed in this head so that it will trickle with as much uniformity as possible through the different tubes $N^2$ and through them into the head N' into which head the chlorine gas is admitted through the pipe H and distributed by the perforated diaphragm P so that it will pass upward through the combining tubes $M^2$ coming in contact with the films of caustic solutions passing downward. To insure the proper flow of gas, suction may be exerted through the pipe R, the resulting hypochlorite solution passed from the pipe M' to the receiver Q.

It will be understood that the apparatus indicated is given as a diagrammatic illustration of the general character of apparatus needed in my process and that the cooling and diluting of the caustic solution can be effected by any convenient means and it will also be understood that the combining device may be very greatly varied in construction, it only being necessary to bring the caustic solution and chlorine gas into contact under favorable conditions and under conditions which will prevent the existence or generation of an undue temperature, due either to the initial temperature of the solution or to heat generated by the reaction between the solution and the chlorine.

It will be obvious that the gas issuing from the cell should be cooled before it enters the combining chamber, ordinarily sufficient cooling will occur in the conduit H but as this conduit is ordinarily of stoneware and not a good conductor it may be advisable to insert in it a cooling device where the conduit is not sufficiently long to insure the proper cooling of the gas.

Having now described my invention, what I claim as new and desire to secure by Letters Patent, is:

1. The method of manufacturing alkaline hypochlorite which consists in bringing chlorine gas in contact with a solution of a caustic alkali under conditions in which the chlorine will not be in excess and in which the temperature of the solution is maintained below 30° C.

2. The method of manufacturing alkaline hypochlorite which consists in bringing chlorine gas in contact with a dilute solution of a caustic alkali containing not over fifteen per cent of caustic alkali, under conditions in which the chlorine will not be in excess and in which the temperature of the solution is maintained below 30° C.

3. The method of manufacturing alkaline hypochlorite which consists in bringing chlorine gas in contact with a dilute solution of a caustic alkali containing ten per cent or less of caustic alkali under conditions in which the chlorine will not be in excess and in which the temperature of the solution is maintained below 30° C.

4. The method of manufacturing alkaline hypochlorite which consists in electrolizing brine and causing the produced caustic alkali solution and chlorine to react together after leaving the cell under conditions in which the chlorine will not be in excess and in which the temperature of the solution is maintained below the point at which the hypochlorite in solution loses its oxygen and reverts in part to salt.

5. The method of manufacturing alkaline hypochlorite which consists in electrolizing brine and causing the produced caustic alkali solution and chlorine to react together after leaving the cell under conditions in which the chlorine will not be in excess and the caustic alkali solution will not contain over fifteen per cent of caustic alkali and in which the temperature of the solution is maintained below the point at which the hypochlorite in solution loses its oxygen and reverts in part to salt.

6. The method of manufacturing an alkaline hypochlorite bleaching solution which consists in forming a dilute solution of caustic alkali containing caustic in such proportion as will give chlorine in such concentration as is desired for the bleaching operation and bringing chlorine gas in proper combining proportion into contact with such dilute solution under conditions which will maintain the temperature of the solution below 30° C.

7. In an apparatus for the manufacture of alkaline hypochlorite an electrolyte cell producing both caustic and chlorine, in combination with a combining device wherein the caustic and chlorine are brought in contact and means for cooling the caustic solution before its entrance into the combining device.

8. In an apparatus for the manufacture of alkaline hypochlorite an electrolyte cell producing both caustic and chlorine, in combination with a combining device wherein the caustic and chlorine are brought in contact and means for cooling and diluting the caustic solution before its entrance into the combining device.

9. In an apparatus for the manufacture of alkaline hypochlorite an electrolyte cell producing both caustic and chlorine, in combination with a combining device adapted to cool the solution resulting from the reaction wherein the caustic and chlorine are brought in contact.

10. In an apparatus for the manufacture of alkaline hypochlorite an electrolyte cell producing both caustic and chlorine, in combination with a combining device adapted to cool the solution resulting from the reaction wherein the caustic and chlorine are brought in contact and means for cooling the caustic solution before its entrance into the combining device.

LA FAYETTE D. VORCE.